Nov. 18, 1941.                H. A. BURGGRABE                2,263,067
                                HEAT TRANSFER
                           Filed Dec. 13, 1937        6 Sheets-Sheet 2

Patented Nov. 18, 1941

2,263,067

UNITED STATES PATENT OFFICE 2,263,067

HEAT TRANSFER

Henry A. Burggrabe, Detroit, Mich., assignor to Borg-Warner Corporation, Chicago, Ill., a corporation of Illinois Application December 13, 1937, Serial No. 179,416

16 Claims. (Cl. 62—5)

This invention relates to the art of refrigeration and has particular reference to a new and improved method of and apparatus for producing refrigeration through the agency of an absorption system.

A principal object of the invention is to provide a refrigeration system of the absorption type, particularly adapted for use in household refrigerators and which is more simple in construction and more efficient in operation than systems now in use.

Another object of the invention is to provide an absorption system wherein the refrigerating periods are relatively long, with the result that the system will give a performance comparable with that of continuous absorption systems now in use.

Another object of the invention is to provide an absorption system of the two-pressure type in which refrigeration is produced almost continuously in the evaporator and in which system the pressures are periodically balanced between the absorber and the generator for a relatively short time so as to effect the transfer of liquor therebetween.

Another object of the invention is to provide that improvement in a two-pressure absorption system wherein pressure is utilized for periodically effecting the transfer of liquor between the absorber and the generator systems.

Another object of the invention is to provide an improvement in the art of absorption refrigeration wherein the circulation of fluids within the system is effected by pressure, with the result that parts of such system may be arranged in various ways and at various levels relative to each other, thereby simplifying the problem of using such a system in various types of installations.

Other objects and advantages of this invention will be apparent from a consideration of the following specification taken in conjunction with the accompanying drawings, of which there are six sheets, and wherein.

Figures 1, 2:
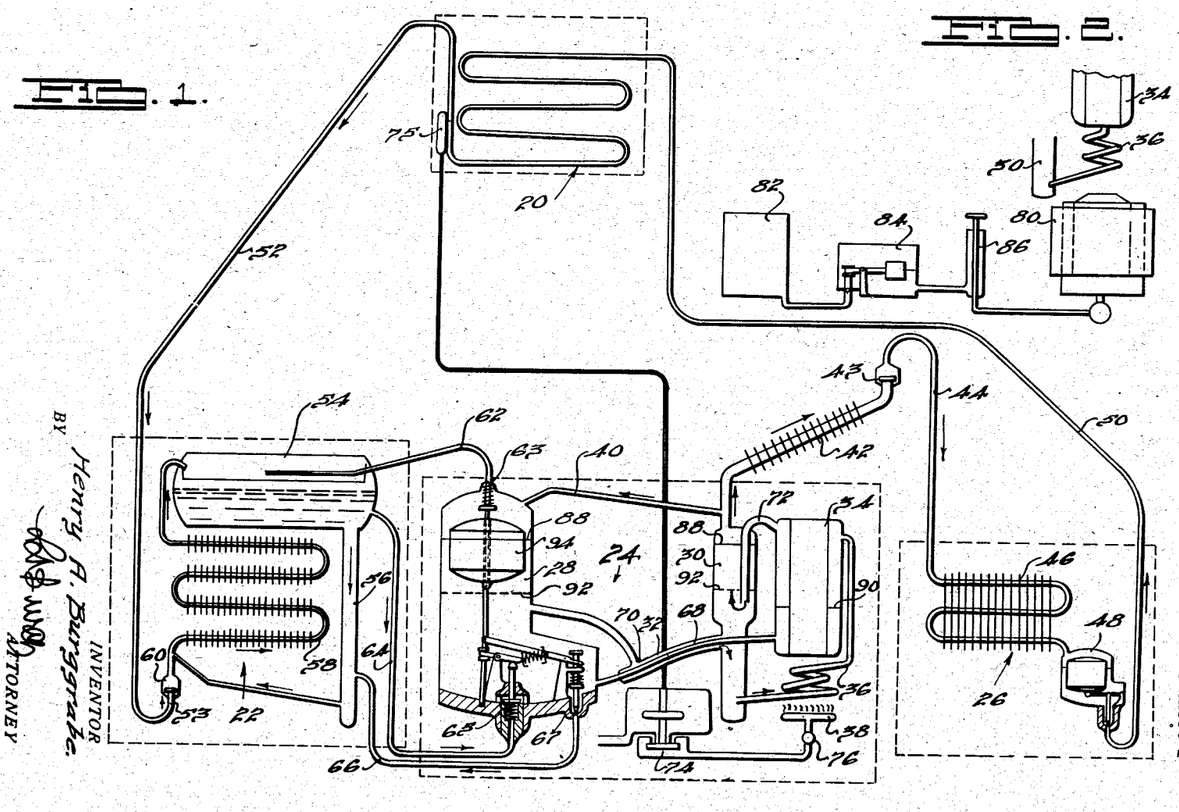
Fig. 1 is a diagrammatic lay-out of an absorption system embodying my invention.
Fig. 2 is a diagrammatic view illustrating a modified form of control.
Figures 3, 4:
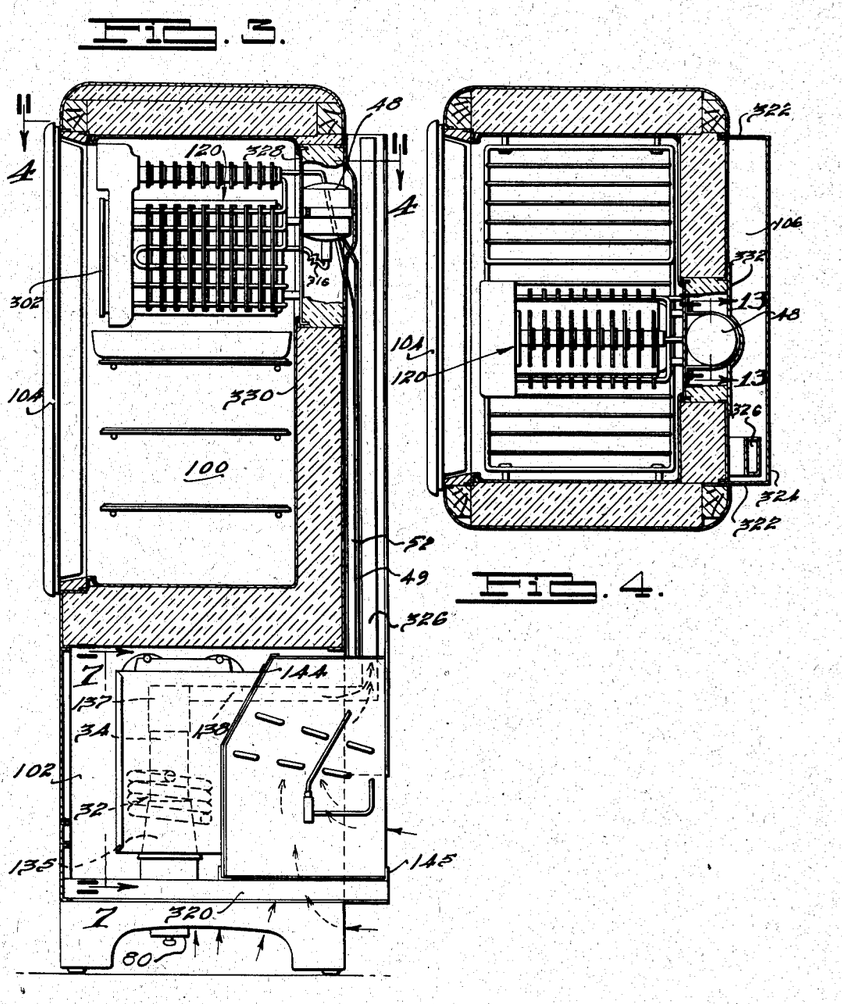
Fig. 3 is a view illustrating the application of a system embodying my invention to a refrigerator cabinet of the household type.
Fig. 4 is a horizontal section taken in the plane along the line 4—4 of Fig. 3.
Figure 5:
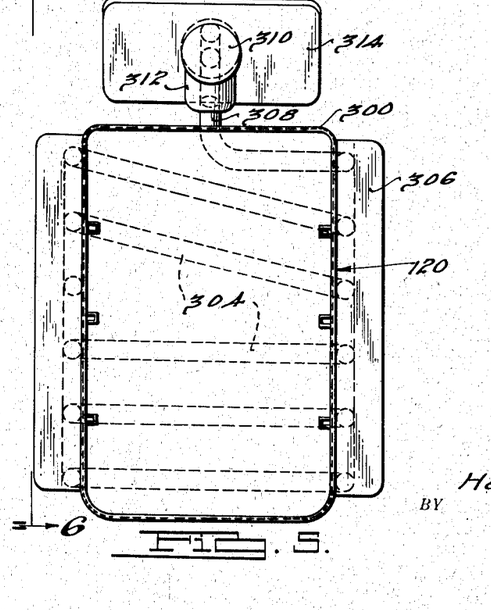
Fig. 5 is a front elevation of the evaporator employed in the cabinet illustrated in Fig. 3.
Figure 6:
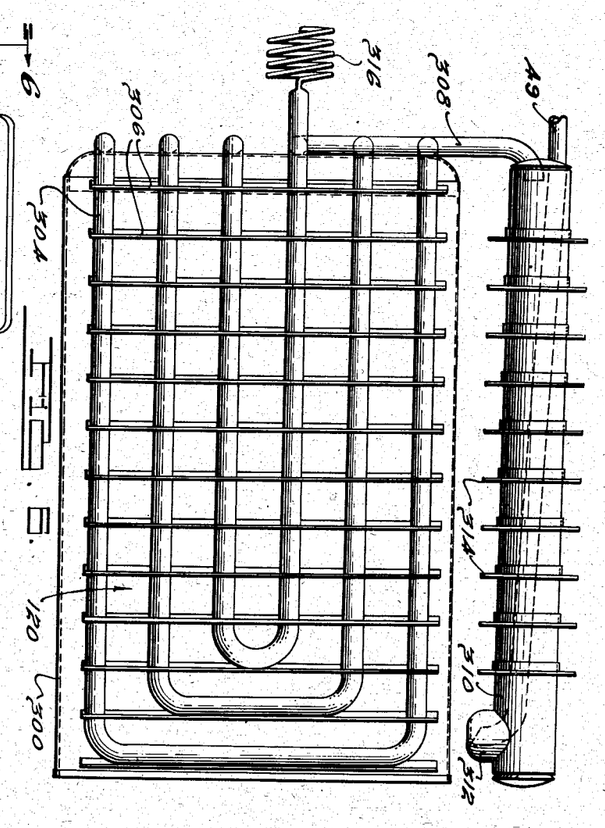
Fig. 6 is a side elevation taken along the line 6—6 of Fig. 5 of the evaporator.
Figure 7:
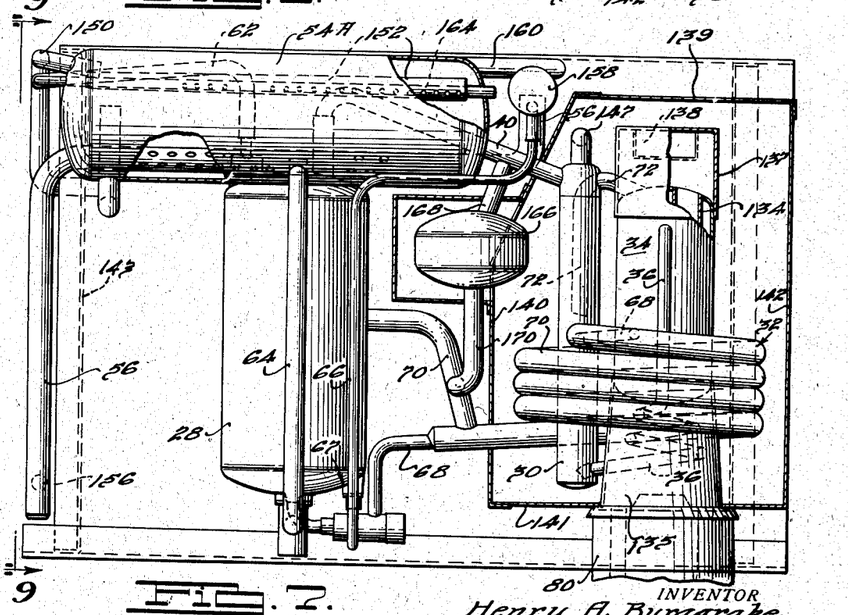
Fig. 7 is a front elevation of the apparatus taken along the line 7—7 of Fig. 3.
Figure 8:
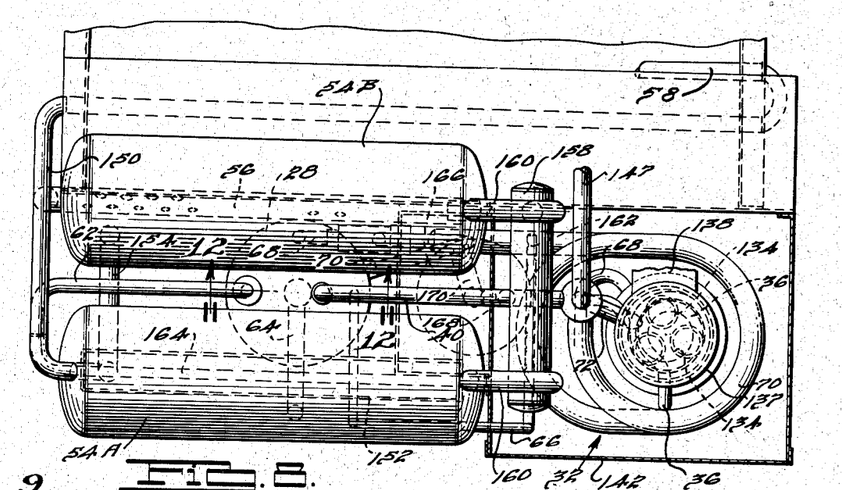
Fig. 8 is a partial top plan of the apparatus illustrated in Fig. 7.
Figure 9:
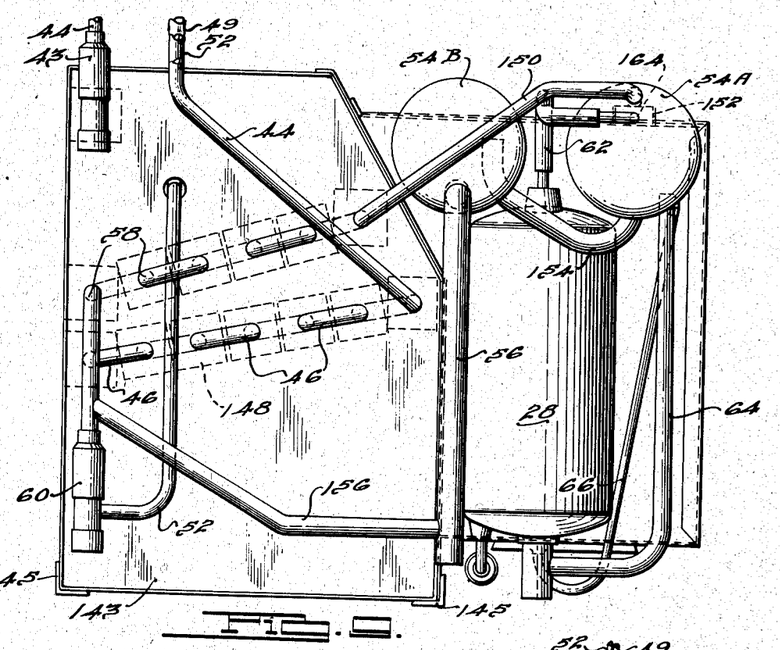
Fig. 9 is a side elevation of the apparatus illustrated in Fig. 7 and taken along the line 9—9 thereof.
Figures 10, 11:
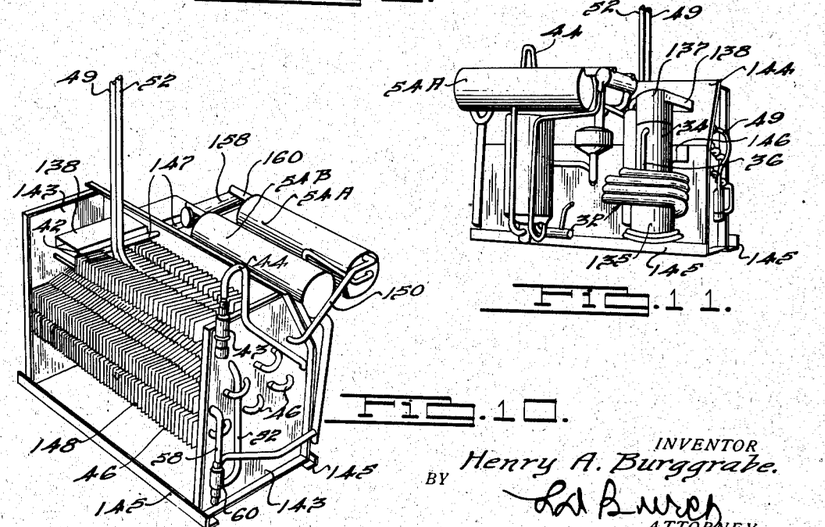
Fig. 10 is a perspective view of the apparatus illustrated in Figs. 7, 8 and 9.
Fig. 11 is another perspective of the apparatus illustrated in Figs. 7, 8 and 9.

Referring now to Fig. 1 wherein the system is illustrated somewhat diagrammatically, the system comprises an evaporator 20, an absorber 22, a generator or generating system 24 and a condenser 26, all of the parts being connected in a closed circuit and being charged with any suitable absorption medium, such as a solution of ammonia and water.

The generator system 24 includes a receiver 28 comprising in its upper region a float chamber and in its lower region a reservoir, an analyzer 30, a heat exchanger 32, a boiler 34, a percolator, thermosiphon, or vapor lift coil 36, a source of heat, such as a gas burner 38, and a vent 40 between the upper end of the float chamber 28 and the analyzer 30. The upper end of the analyzer 30 is connected by a rectifier 42 and a check valve controlled conduit 44 to the condenser system 26. The condenser system 26 includes a condenser 46 and a high side float 48. The high side float is connected by a liquid refrigerant conduit 50 to the intake side of the evaporator 20, and the exhaust side of the evaporator 20 is connected by a suction line 52 to the absorber system 22.

The absorber system 22 comprises a header 54, a vertically arranged pipe 56, communicating at its upper end with the bottom of the header 54, and a finned coil 58 connected at its bottom end to the lower portion of the pipe 56 and at its upper end to the upper part of the header 54. The suction line 52 from the evaporator terminates in an upwardly rising portion 53, having a check valve 60, which connects with the finned coil 58 above the bottom thereof. The top of the header 54 in the absorber system is connected by a valve controlled vent 62 to the top of the float chamber; a lower part of the header 54 is connected by a valve controlled passageway 64 with the bottom of the float chamber 28, and the bottom of the pipe 56 is connected by a valve controlled conduit 66 with the bottom of the float chamber 28. The bottom of the float chamber 28 is connected with the bottom of the boiler 34 by a weak liquor line 68, which forms one part of the heat exchanger 32, and an upper part of the float chamber 28 is connected by a strong liquor line 70, which strong liquor line forms a part of the heat exchanger 32. The percolating coil 36, at one end thereof, is connected to the bottom of the analyzer and the other end thereof opens into the vapor space in the boiler 34. The vapor space in the boiler 34 is connected by a conduit 72 to an intermediate part of the analyzer, said conduit 72 terminating below the liquid level in the analyzer 30.

During the heating cycle, gas may be supplied to the burner 38 through a thermostatic control valve 74 and past a safety shut-off valve 76. The safety shut-off valve 76 will operate to shut off the supply of gas to the burner 38 in the event the flame thereof goes out. The thermostatic control valve includes a thermo-responsive element 75 thermally associated with the tail end of the evaporator coil 20. The thermostatic control valve 74 may be set so as to pass a predetermined amount of gas at all times in order to provide a low flame in the burner 38, and when the temperature of the evaporator 20 rises above a pre-selected degree, the valve 74 will open to pass a predetermined larger quantity of gas so as to produce a high flame in the burner 38, or the valve 74 may operate to modulate the gas supply above a predetermined minimum and in accordance with the temperature of the evaporator 20. The system appears to work satisfactorily, however, if the valve 74 has only two positions which will supply a low or high quantity of gas to the burner to produce a low or a high flame. When the temperature of the evaporator 20 drops below the temperature setting of the valve 74, the valve will operate to cut the supply of gas to the burner down to the minimum.

In Fig. 2 there is illustrated a modified form of burner control useful in connection with a kerosene burner. In this modification, a kerosene burner 80 is adapted to supply heat to the absorption system, and the supply of kerosene to the burner 80 from a reservoir 82 may be controlled by a float controlled valve 84. A manually controlled valve 86 may be used between the float control 84 and the burner 80 for regulating the amount of fuel supplied to the burner 80 and thereby modulating the flame thereof. With this kind of a control, the user of the absorption system could regulate the amount of heat supplied to the system so as to produce whatever refrigeration was desired within the limits of the capacity of the system. Of course, a thermostatically controlled valve, like the valve 74, might be employed in connection with a kerosene burner 80 for regulating the fuel supply thereto.

The liquid levels in the absorber and generator systems are illustrated as such levels are at the beginning of a generating cycle. The float chamber 28 is filled to a level 88; the analyzer contains liquid to a level 88, corresponding to the level of liquid in the float chamber and liquid stands in the boiler 34 at a level 90, which corresponds with the level of the lower end of the tube 72 in the analyzer 30. The analyzer 30 and the float chamber 28 are in open communication, and the liquid therein will stand at the same level, while the liquid in the boiler 34 will stand at a lower level, due to the pressure head required to force vapor through the tube 72. The conduits 62, 64 and 66, connecting the float chamber 28 with the absorber system, are closed by the valves 63, 65 and 67 so that the generator system 24 is closed from the absorber system 22.

At the beginning of the generating cycle, the generator system is charged with strong liquor which stands therein to the levels 88 and 90. The addition of heat to the generator system by the burner 38 will result in the evolution of ammonia gas. The percolating coil 36 is arranged above the burner 38 so that the contents of the percolating coil 36 are heated. Heating of the percolating coil 36 will cause the liquor within the coil 36 to percolate, that is, heat will drive the ammonia vapor out of the ammonia water solution and the vapor will rise in the percolating coil 36 carrying the liquor along with it into the upper part of the boiler 34 where the liquor spills over into the bottom of the boiler 34, while the vapor is forced through the conduit 72 into the analyzer where, after emerging from the tube 72, ammonia vapor bubbles up through the strong liquor in the analyzer 30 and passes through the rectifier 42 past the check valve 43 through the conduit 44 into the condenser 46, the pressure in the generator system being higher than the pressure in the condenser system. In the boiler 34, the liquor therein is also subjected to heat so as to aid in the expulsion of ammonia vapor from the liquor and the liquor, after the expulsion of ammonia therefrom, being weak liquor, will return by gravity through the conduit 68 to the lower part of the float chamber 28. Since ammonia liquor is pumped through the percolating coil 36 from the bottom part of the analyzer 30 up into the boiler 34, liquor will flow from the upper part of the float chamber 28 through the conduit 70 into the analyzer from whence the liquid is taken through the percolating coil 36 into the boiler. The weak liquor, in returning to the float chamber 28 through the conduit 68, will pass through the heat exchanger 32 for transferring heat from the hot weak liquor to the cold strong liquor which is flowing through the conduit 70 into the analyzer 30. Likewise the bubbling of the ammonia vapor, after leaving the tube 72, through the analyzer 30, will serve to cool the ammonia vapor and tend to effect the condensation of water vapor out of the ammonia vapor. Further, the ammonia vapor passing through the rectifier 42 will also tend to precipitate water which will drain back into the analyzer. The rectifier 42 is illustrated as being an air cooled rectifier. The transfer of strong liquor from the float chamber 28 to the boiler 34 and weak liquor from the boiler 34 to the float chamber 28 will continue, due to the pumping action of the percolating coil 36, until the level of liquid in the float chamber and analyzer falls to the level indicated at 92, and at which time the liquor in the generator system will be weak liquor. The ammonia vapor driven out of the liquor in the generator system, in the meantime, has passed into the condenser 46, which is illustrated as being an air cooled condenser, and in the condenser the ammonia vapor will condense. The high side float 48 will operate to regulate the flow of ammonia liquid to the evaporator 20 through the conduit 50. In the evaporator 20, vaporization of the ammonia liquid takes place and the ammonia vapor is returned to the absorber system through the conduit 52. The pressure in the condenser system will be less than the pressure in the generator system, due to the dissipation of heat from the ammonia in the condenser system, and the high side float 48, when closed, effectively separates the condenser system from the evaporator system, wherein the pressure is lower than in the condenser system. The pressure in the absorber system, during the generating cycle, is still lower than that in the evaporator system so ammonia vapor will flow through the conduit 52 into the absorber system past the check valve 60. The ammonia vapor returned to the absorber system will enter the finned coil 58 and effect a circulation of liquid by a percolating action in the absorber upwardly through the coil 58 into the upper part of the header 54 and downwardly through the pipe 56 to the bottom end of the coil 58. In this manner, absorption of ammonia vapor into the liquor in the absorber is promoted and the heat of absorption is dissipated by the finned coil 58.

At the end of the generating cycle, the level of liquid in the float chamber 28, having fallen to level 92, will lower float 94, which will open the valve 67. The mechanism by which the valves 63, 65 and 67 are controlled by the float 94 will be described in detail in connection with Fig. 12. Due to the fact that the pressure in the generator system is higher than the pressure in the absorber system, the weak liquor in the generator system will be forced through the conduit 66, after the opening of valve 67, into the absorber system, thereby raising the level of liquid in the absorber. The weak liquor being heavier than the strong liquor, will tend to remain in the bottom part of the absorber. All of the liquor in the float chamber, all of the liquor in the analyzer above the bottom of conduit 70, and all of the liquor in the boiler 34 above the conduit 68 will pass through the conduit 66 into the absorber and so soon as all of such liquor has been expelled from the generator system, vapor will pass through the conduit 66 into the absorber system, thereby equalizing the pressure between the absorber system 22 and the generator system. So soon as the pressure in the generating system and the absorber system is equalized, the valves 63 and 65 will open, whereupon strong liquor will flow by gravity through conduit 64 from the absorber into the float chamber 28 and the vent 62 will permit such gravity flow. Liquor will continue to flow into the float chamber 28 until the level therein reaches level 88, whereupon float 94 will operate to seat valves 63, 65 and 67, thereby separating the generator system from the absorber system, and the generating cycle will then commence. The period during which the valves 63, 65 and 67 are open may be designated as the transfer period, and this period is relatively short; say in the neighborhood of two or three minutes, whereas, the generating period may, depending upon the load upon the evaporator 20, last for about one-half hour or more. During the transfer period the check valve 60 will seat, thereby preventing the backing up of the liquor into the evaporator system, and during the transfer period, evaporation of ammonia in the evaporator may cease, if the vapor pressure in the evaporator rises above that at which evaporation of ammonia can take place. Due to the fact that the transfer period is relatively short, the burner 38 can continue to operate without any great amount of loss in efficiency, and during the transfer period the percolating coil 36 and the bottom part of the analyzer will contain ammonia liquor, and hence, during the operation of the apparatus, the generation of ammonia vapor will be continuous.

In Figs. 3 to 14 inclusive, an apparatus embodying the system illustrated in Fig. 1 is illustrated, as applied to a refrigerator cabinet of the household type. The cabinet comprises a heat insulated provision compartment 100 and an apparatus compartment 102 arranged beneath the provision compartment, a suitable cabinet having insulated walls and a sheet metal exterior providing these compartments. The provision compartment 100 is provided with an access opening and a door 104 for closing the same, and an evaporator 120 is arranged centrally and adjacent the upper end of the provision compartment 100. The cabinet is constructed to provide a flue 106 at the rear thereof, and the generator, absorber and condenser are assembled as an integral unit and arranged within the apparatus compartment 102. The front of the apparatus compartment may be removable so as to provide access to the apparatus.

The unit which includes the absorber, the generator, the condenser and the rectifier is illustrated in Figs. 7 to 11 inclusive, and to facilitate an understanding of the construction as illustrated in Figs. 3 to 14 inclusive, the same reference characters will be used to indicate the elements of the system as are used in connection with Fig. 1. Referring to Figs. 7 to 11 inclusive, the boiler 34 is illustrated as comprising a vertically arranged tubular header having a plurality of tubes 134 extending therethrough and adapted to provide flues. The spiral part of the percolating coil 36 is arranged below the flues in the boiler 34, and the lower end of the percolating coil 36 communicates with the lower end of the analyzer vessel 30. A sleeve 135 may be secured to the bottom end of the boiler shell 34 and depend therefrom so as to provide a shield about the spiral part of the percolating coil 36 and to form a seat for the upper end of a kerosene burner unit 80. A cap 137 is disposed upon the upper end of the boiler shell 34 and has connected to it a laterally extending flue 138, the cap 137 serving to collect the flue gases and direct the same into the flue 138. The upper end of the boiler 34 is connected by the conduit 72 to the analyzer, said conduit extending downwardly into the analyzer to about the middle thereof. The boiler 34 and the analyzer 30 are enclosed in a compartment formed by walls 139, 140, 141, 142 and 144.

The unit which comprises the absorber, the generator, the condenser and the rectifier is carried by a box-like frame which comprises a pair of side frame members 143, closed at one side by a wall 144 and connected at the bottom by frame members 145. The boiler 34 is connected by a bracket 146 to the wall 144 so as to be carried thereby, and the flue 138 extends through an opening in the wall 144. The compartment defined by the walls 139, 140, 141 and 142 also is carried by the wall 144. The heat exchanger 32 also is arranged within the compartment around the boiler and comprises a double coil of pipes 70 and 68 disposed around the boiler and the analyzer. One end of the coil 70 is connected to an intermediate part of the analyzer 30 so as to discharge thereinto, and the inner coil 68 extends through the analyzer and is connected to an intermediate part of the boiler 34. The upper end of the analyzer is connected by a conduit 147 to the rectifier 42, which is illustrated as being a finned coil arranged slightly at an angle so as to drain the condensed water vapor back into the top of the analyzer. The end of the rectifier coil extends through one of the end walls of the frame where a strainer and check valve 43 are arranged. A conduit 44 then connects the rectifier with the condenser 46. The condenser 46 is illustrated as comprising a continuous coil supported by the end frame members 143 and having fins 148 to increase the heat dissipating capacity of the coil. The condenser coil slopes toward one end so as to collect condensed ammonia in such end, and this end of the condenser coil is connected by a conduit 49 to the high side float 48, which is arranged in the wall of the cabinet behind the evaporator 120. The suction line 52 leading from the evaporator to the absorber may be arranged in good thermal contact with the liquid line 49, and such lines may be arranged within the flue 106. The suction line 52 terminates in a valve body within which a check valve 60 is arranged, and through the valve body the suction line 52 is connected to the finned coil 58, which constitutes a part of the absorber. The finned coil 58 is horizontally arranged above the condenser 46 and supported by the end frame members 143, and the upper end of the finned coil 58 is connected by a conduit 150 to an upper part of one of the headers of the absorber. In practice, the absorber may be provided with two headers 54a and 54b, and the conduit 150 is adapted to discharge liquor into the upper end of header 54a and into a horizontal trough 152 arranged in such header 54a. The liquid discharged from the conduit 150 will overflow the trough 152 and spill over into the bottom of the header 54a. A conduit 154 connects the bottom part of the header 54a to an intermediate part of the header 54b. The coil 58 is finned to expedite the dissipation of heat, aiding the absorption of ammonia vapor in the weak liquor. In addition to the headers 54a and 54b, and the coil 58, the absorber comprises a small header 158 arranged at the top ends of the headers 54a and 54b and in communication therewith by means of conduits 160. The upper end of pipe 56 passes through the lower part of header 54b wherein it is perforated and terminates in header 158. The valve controlled conduit 66, which conducts weak liquor from the float chamber 28 to the absorber, terminates in a horizontally arranged distributor pipe 162, arranged within header 158. The valve controlled conduit 64, which conducts strong liquor from the absorber to the float chamber, is in communication with the lower part of header 54a, and the vent 62 between the float chamber 28 and the absorber terminates in a distributing nozzle 164 which extends through the trough 152. The ends of the nozzle 164 project through the end wall of the header 54a and form a support for the trough 152. Ammonia vapor returning to the absorber from the evaporator will effect a circulation of liquid upwardly through the coil 58, the conduit 150 and into the trough 152, thence the liquid will spill over into header 54a, pass through conduit 154 into header 54b, and thence pass through the perforations into the pipe 56 downwardly into conduit 156 and back to the bottom of coil 58. Such circulation within the absorber will promote the absorption of ammonia vapor in the liquor in the absorber, and the heat will be dissipated largely through the finned coil 58.

Weak liquor from the float chamber 28, which passes through the valved conduit 66 into the absorber, is conducted by the conduit 66 and the perforated distributor 162 into the header 158, thence into the end of the pipe 56 and thence through pipe 56 into the header 54b, as well as downwardly through the pipe 56 into the lower part of the coil 58. By bringing the weak liquor from the float chamber 28 into the absorber in this manner, such weak liquor is kept separate from the strong liquor in the header 54a which is about to be transferred through conduit 64 into the float chamber 28.

The vent 40 affords communication between the upper part of the analyzer 30 and the upper part of the float chamber 28 so that the pressures and the liquid levels in these two tanks are equal. An auxiliary reservoir or tank 166 may be connected at its upper end by a conduit 168 to the vent 40 and at its lower end by conduit 170 to conduit 70. This chamber 166 provides additional reservoir or storage space for strong liquor coming into the float chamber 28 from the absorber.

Figures 12, 13, 14:
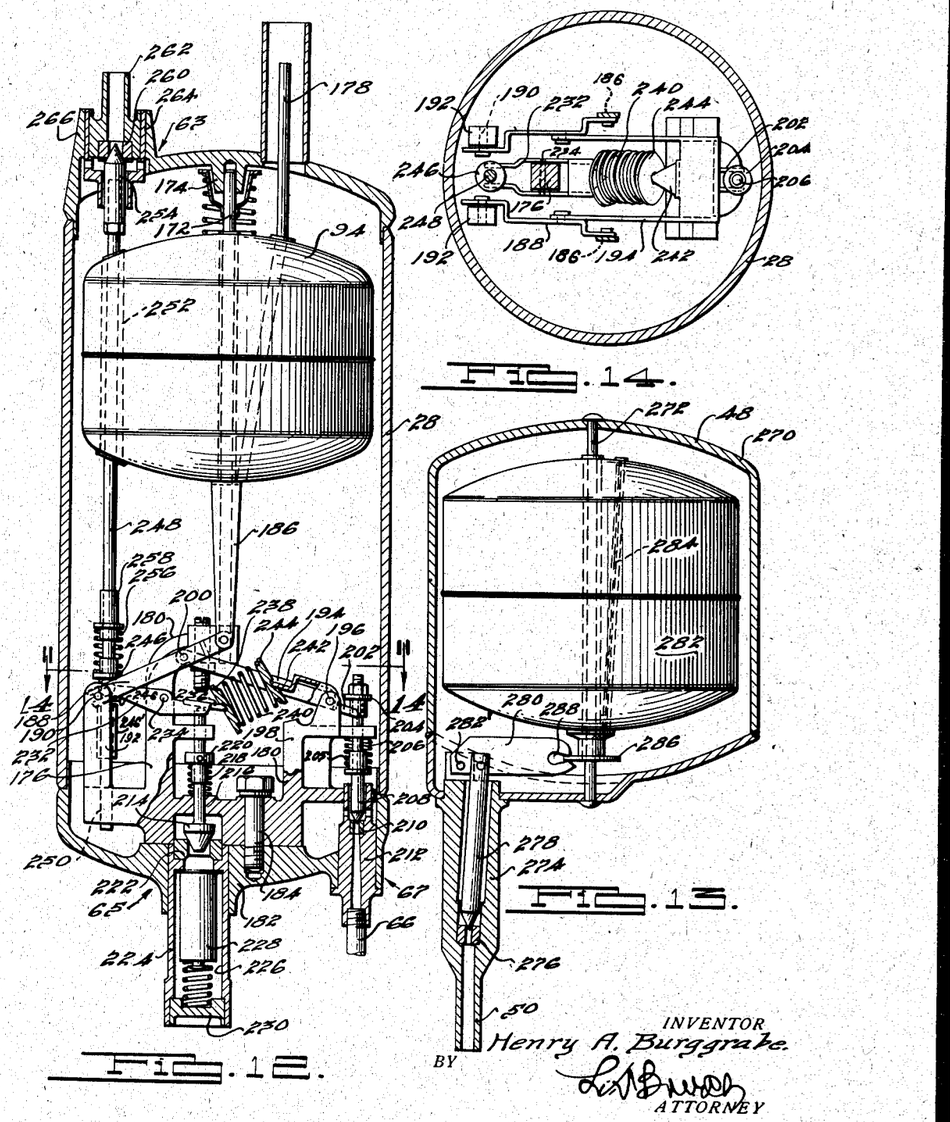
Fig. 12 is a vertical section through the transfer chamber and taken on the line 12—12 of Fig. 8.
Fig. 13 is a vertical section through the high side float and taken in a plane along the line 13—13 of Fig. 4.
Fig. 14 is a horizontal section through the transfer valve mechanism and taken in a plane on the line 14—14 of Fig. 12.

Referring to Figs. 12 and 14, the float chamber 28 is provided with three valves, 63, 65 and 67, which are operable, at least in part, by the float 94. The float chamber 28 comprises a vertically arranged header having float 94 therein. The float 94 is guided upon a vertical post 172, the upper end of which is secured in a boss 174 in the upper end of the header, and the lower end of which post is held by bracket 176. The float 94 is provided with a sleeve on its axis which telescopes post 172 and guides the float 94 upon movement thereof, responsive to changes in liquid levels in the float chamber 28. The float 94 may have a scavenging tube 178 extending into the bottom thereof so as to utilize changes in pressure within the chamber 28 for expelling any liquid which might leak into the interior of float 94. The bracket 176 may be formed integrally as a part of a casting 180 which is bolted in place to the bottom 182 of the float chamber 28 by means of one or more bolts 184. The float 94 is adapted to operate a snap-actuated toggle mechanism for controlling the valves 63, 65 and 67. Of these valves, 67 is positively opened by lowering of the float, while valves 63 and 65 will open only after pressure between the absorber and the float chamber 28 is substantially equalized. The snap-acting toggle mechanism comprises an arm 186 carried by the bottom of float 94, a lever 188 having a pivoted connection at one end thereof to the end of arm 186 and a pin and slot connection 190 at the other end thereof to a bifurcated bracket 192, a lever 194, pivoted at 196 to a bracket 198, and having one end thereof pivoted at 200 to lever 188 and the other end thereof provided with fingers 202, engageable with a collar 204 carried by valve stem 206 of valve 67. The collar 204 is set on the valve stem 206 so that the fingers will not engage the collar 204 until after lever 194 has moved a considerable distance. The valve stem 206 carries a needle valve 208 cooperable with a seat 210 carried by a fitting 212 which projects out of the float chamber 28 and to which the end of conduit 66 is connected. The needle 208 and seat 210 comprise the valve 67 which controls communication between the conduit 66 and the interior of the float chamber 28.

Valve 65 comprises a needle 214 mounted for vertical movement in a guide 216 and having a spring 218 between the guide 216 and the collar 220 carried by the stem of the needle 214 for biasing the needle 214 off of its seat 222. The seat 222 is pressed in a bushing 224 which provides filter chamber 226, in which a filter 228 is arranged, and the bottom of bushing 224 is closed by a plug 230. Conduit 64 is connected to one side of the bushing 224 and the needle 214, and seat 222 controls communication between the conduit 64 and the interior of the float chamber 28. The needle is held on its seat by a lever 232, a part of which engages the end of the stem of the needle valve 214. The lever 232 is pivoted to bracket 176 at 234 and is provided at one end thereof with a finger 236 which engages a notch in a plate 238 at one end of the spring 240. Lever 194 also is formed to provide a finger 242 which engages in a notch in another plate 244 at the other end of spring 240. The spring 240 is adapted to snap the lever 232 from one of its positions to the other and in the position illustrated in Fig. 12 the spring 240 holds lever 232 in such a position so as to hold needle valve 214 on its seat. The other end of lever 232, which is bifurcated, is arranged between a pair of collars 246 and 246' carried by a shaft 248. Shaft 248 is guided at one end thereof for vertical movement by a guide bore 250 formed in the casting 180 and extends through a sleeve 252 formed in float 254 and has fixed to the end thereof a needle valve 254. The lower one of the collars 246' is pinned to the shaft 248, while the upper one of the collars 246 is backed up by a spring 256, which spring is backed up by a stop 258 fixed to the shaft.

In addition to the needle 254, the valve 63 comprises a seat 260 carried by a fitting 262 pressed into a bushing 264 carried by a boss 266 formed in the end of the float chamber header.

In Fig. 12, the valves are shown in their closed position, and the float 94 is shown in its high position. When the level of the liquid in the float chamber 28 falls, arm 186 will move lever 188 and lever 194. When the float reaches the low liquid level in the float chamber 28, lever 194 will raise needle valve 208 off its seat, thereby opening valve 67 and establishing communication between the float chamber 28 and the absorber, and the finger 242 will be lower than the finger 236, whereupon spring 240 will snap lever 232 to its other position. At this point, the pressure in the generator system and the float chamber 28 will force the weak liquor in the generator system into the absorber through the conduit 66. When the snap-acting toggle mechanism is operated, the lever 232 will move away from the end of the stem of the needle valve 214 and will also move shaft 248 downwardly. The upper end of the shaft 248 seats within a socket within the needle valve 254, but is not connected thereto, so that when shaft 248 is moved downwardly by lever 232 the needle valve 254 will be held on its seat, due to the difference in pressure prevailing between the float chamber 28 and the absorber. Likewise, due to the pressure differential between the float chamber 28 and the absorber, needle valve 214 will be held upon its seat. After all of the weak liquor has been discharged from the float chamber 28 through conduit 66, vapor will pass through such conduit and thereby permit the equalization of pressure between the float chamber 28 and the absorber. When the pressure between the float chamber 28 and the absorber is substantially equalized, the needle valves 214 and 254 will become unseated, the spring 218 operating to unseat needle valve 214 and gravity operating to unseat needle valve 254. The opening of valve 63 will vent the upper part of float chamber to the upper part of the absorber so as to permit strong liquor to flow from header 54a through conduit 64 and past valve 65 into the float chamber 28. It will be observed at this point that the relative dimensions of the conduits 64 and 66 and the valves 65 and 67 is such that considerably more liquor can be transferred by conduit 64 than by conduit 66. The manner in which the conduit 66 discharges weak liquor into the absorber, as previously described, prevents any great amount, if any, of weak liquor returning to the float chamber 28 after the pressure between float chamber 28 and the absorber is equalized and the valves 65 and 63 are opened. When the level in the float chamber 28 rises, the float 94 will operate to actuate the snap-acting toggle mechanism so as to positively seat the valves 63 and 65, while the valve 67 will be seated by spring 205 so soon as the lever 194 moves.

After the valves 63, 65 and 67 are closed, the pressure in the generator system will increase, due to the fact that heat is being added to the liquor in the generator system by the burner 80.

In Fig. 13 the details of the high side float 48 are illustrated. The high side float 48 comprises a shell 270 having a vertically arranged stationary shaft 272. A valve body 274 is connected to the lower part of the shell 270 and has a passageway therethrough in which a seat 276 for needle valve 278 is disposed. The needle valve 278 is adapted to be actuated by a lever 280, pivoted at 282' to a part of the valve body 274. A float 282, guided by the shaft 272 and having a scavenging tube 284, such as the scavenging tube 118, is provided with a collar 286 which engages a slot 288 in the lever 280 for actuating the same upon movement of the float 282, responsive to changes in level of liquid within the shell 270. The high side float is connected to receive liquid from the condenser through conduit 49 and the end of the valve body 274 is connected to the evaporator by a conduit 50.

The evaporator as illustrated in Figs. 3, 4, 5 and 6 comprises a sleeve 300 closed at its back and adapted to be closed at its front by a door 302, and a coil of tubing 304 coiled around the sleeve 300 and secured in good thermal contact therewith. Fins 306 may be employed for increasing the heat exchange surface of the evaporator. The tail end 308 of coil 304 discharges into a horizontally arranged header 310, and suction or vapor return line 52 extends into the header 310 and terminates in a well 312 formed therein. The well 312 is adapted to collect whatever water may collect in the evaporator, and so soon as the water rises in the well 312 above the end of suction line 52 the pressure in the evaporator will force a slug of water through the conduit 52 back to the absorber. The header 310 may be finned at 314 to increase the heat dissipating capacity thereof. The header 310 is employed so as to prevent frosting back of the suction line 52. A capillary tube 316 may be arranged in the conduit 50 between the high side float 48 and the evaporator so as to prevent the expansion of ammonia liquid prior to entering the evaporator. This capillary tube also will serve to cut down the pressure drop at the needle of the high side float 48. As illustrated in Fig. 1, a control bulb, such as a bulb 75, may be mounted upon the evaporator for operating the thermostatically controlled valve which supplies fuel to the burner.

The unit comprising the absorber, the generator, the condenser and the rectifier is adapted to be arranged within the apparatus compartment 102, and to this end the bottom of the apparatus compartment may be provided with a pair of side rails 320 upon which the ends of the bottom frame members 145 of the unit are adapted to rest. As will be apparent from an inspection of Fig. 3, the unit is arranged to project slightly out the back of the apparatus compartment, and the back of the unit, above the bottom of the condenser coil 148, is adapted to be received within the bottom of the flue 106. The back of the unit, below the condenser coil 148, and the bottom of the unit are open so that air may circulate upwardly across the condenser, absorber and rectifier coils and through the flue 106. The flue 106 is formed by a pair of side members 322 projecting rearwardly from the cabinet and a back panel 324 which closes the space therebetween so as to define a flue of rectangular cross section at the back of the refrigerator cabinet. The laterally extending flue 138, through which the products of combustion from the burner pass, empties into a vertical flue 326 which is open at the bottom, so that fresh air passes upwardly in the flue 326 with the flue gases to aid in dissipating the heat thereof. While the top of the unit above the finned coils is open, the wall 144 terminates a very short distance below the underside of the bottom of the provision compartment 100, so as to permit a circulation of air upwardly through the apparatus compartment and in contact with the float chamber 28, the header 54a, 54b and the conduits therebetween. The bottom of the apparatus compartment is open so as to also permit the circulation of air up through the bottom of the unit and past the finned coils of the condenser, the absorber and the rectifier.

By removing the burner 80, which may be bolted to the flange on the bottom of sleeve 135, and by removing the back panel 324 of the flue, the unit including the condenser, the absorber and the generator may be removed from the apparatus compartment, and at the same time the evaporator 120 may be removed by moving the same laterally through the opening in the rear wall of the cabinet. In this manner, the absorption unit may be manufactured, assembled and tested independently of the cabinet and installed therein and removed therefrom without breaking any of the lines of the system.

The high side float 48 is adapted to set in a space in the rear wall of the cabinet behind the evaporator 120. The evaporator 120 may be mounted upon a removable closure 328 which closes the opening formed in the food tank lining 330, and the high side float 48 may be secured to the rear side of such closure. Preferably the space around the high side float is filled with insulation. A removable plate 332 is secured to the back wall of the cabinet for holding the insulation in place. The lines 49 and 52 may pass through the closure 328 in any suitable manner, such as by cutting notches in the edges of such closure and sealing such notches with any suitable packing material.

The apparatus illustrated in Figs. 3 to 14 inclusive, embodies the system illustrated in Fig. 1 and will operate in accordance with the description of operation given in connection with Fig. 1.

The system may be provided with a suitable charging valve so as to permit the introduction of absorption fluid into the system after assembly thereof and with a safety device, such as a fusable plug or rupture disc, so as to forestall any possible explosion thereof.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. An absorption refrigerating apparatus including means defining an absorber and means defining a generating system including a boiler and a receiver for strong and weak liquor, vapor lift means for effecting a local circulation of fluid from said receiver to said boiler, and heating means for said boiler, said receiver being separated from said heating means so as not to be directly affected by the heat therefrom.

2. In an absorption apparatus, a generator system, an absorber system, said generator system including a liquid receiver and a boiler in open communication with each other, thermosiphon means for effecting a circulation of fluid between said receiver and said boiler and forming part of said communication therebetween, connections between said receiver and said absorber, means for closing said connections, and means in said receiver operable for opening said closing means, responsive to a change in the liquid level in said receiver for periodically effecting the transfer of fluid between said receiver and said absorber system.

3. In an absorption apparatus, an absorber system, a generator system, said generator system including a receiver and a thermosiphon generator, said receiver being separated from the generator, heating means for the generator, connections between said receiver and said absorber system for periodically transferring fluid therebetween, valves in said receiver controlling said connections, said generator system including fluid connections arranged between said receiver and said generator and including means for transferring heat from the hot weak liquor returning to the receiver to the cold strong liquor flowing to the generator.

4. In an absorption apparatus, a generator system, an absorber system, means for storing weak liquor in the generator system during the time that heat is applied to the generator system for generating refrigerant vapor, means for periodically transferring said weak liquor to one part of the absorber system and means for thereafter transferring strong liquor from another part of the absorber system to the generator system, the part of the absorber system to which said weak liquor is transferred being at a lower elevation than that part from which strong liquor is transferred to said generator system.

5. In an absorption apparatus, a generator system, an absorber system, means for heating absorption fluid in one part of the generator system so as to generate refrigerant vapor, means for storing weak liquor in another part of the generator system at a temperature materially less than that prevailing in said other part of said generator system and means for periodically utilizing pressure in the generator system for transferring said weak liquor to the absorber system and thereby equalizing the pressure between the absorber system and the generator system, so as to permit the transfer of strong liquor from the absorber system to the generator system.

6. In an absorption apparatus, an absorber system, a generator system, said generator system including a liquid receiver, connections between said liquid receiver and said absorber system, operable for venting said receiver to said absorber system, transferring weak liquor from said receiver to said absorber system and transferring strong liquor from said absorber system to said receiver, valves for controlling said connections, snap-acting mechanism for operating said valves and a float responsive to changes within the liquid level in the receiver for operating said snap-acting mechanism.

7. In an absorption apparatus a generator system including a receiver and a continuous type of generator, means for circulating fluid from said receiver to said generator and back to said receiver and including a heat exchanger arranged so as to exchange heat between the hot weak liquor flowing from the generator and the cold strong liquor flowing to the generator.

8. In an absorption apparatus an absorber system, a generator system, said generator system including a thermosiphon generator and a transfer device, said transfer device including a liquid receiver and being in open communication at all times with the generator, said transfer device being adapted for storing absorption fluid and for periodically effecting the transfer of weak liquor therefrom to the absorber system and strong liquor from the absorber system to the generator system, said transfer device being adapted to store fluid at a temperature materially less than that of said generator.

9. Absorption apparatus comprising a high pressure part and a low pressure part, transfer mechanism for periodically effecting a transfer of fluid therebetween comprising a vent connection between said high and low pressure parts and a pair of liquid connections between said high and low pressure parts, valves for controlling said connections and snap-acting mechanism for controlling said valves and a float responsive to changes in liquid level in one of said parts for operating said snap-acting mechanism.

10. An absorption apparatus of the type having an absorber system normally operating at a relatively low pressure and a generator system normally operating at a relatively high pressure during the same time that said absorber system is operating, said generator system comprising a boiler, an analyzer, a receiver, a conduit for conducting strong liquor from the receiver to the analyzer, thermosiphon means for conveying liquor from the bottom of the analyzer to said boiler, a conduit for conducting vapor from said boiler to a point below the liquid level in the analyzer, and a conduit for conducting weak liquor from the boiler to the bottom of said receiver, said strong liquor conduit from said receiver to said analyzer and said weak liquor conduit from said boiler to the bottom of said receiver, being arranged in heat exchange relationship.

11. In an absorption apparatus having a high pressure side and a low pressure side with a generator system arranged on the high pressure side and an absorber system arranged on the low pressure side and in which the pressure is periodically equalized between the generator system and the absorber system for effecting the transfer of fluid therebetween, said generator system comprising heating means and a fluid circulating circuit including storage means having a part for storing strong liquor and a part for storing weak liquor, thermosiphon means for effecting circulation of liquor between said parts of said storage means and for generating refrigerant vapor under the effect of said heating means, and means for transferring heat from the hot weak liquor returning to the storage means to the cold strong liquor flowing from said storage means.

12. In an absorption apparatus a generator system comprising a boiler, an analyzer, a receiver, thermosiphon means for conveying liquor from the bottom of said analyzer to said boiler, a conduit for conducting vapor from said boiler to a point below the liquid level in the analyzer, and a heat exchanger comprising a conduit for conducting strong liquor from the receiver to the analyzer and a conduit for conducting weak liquor from the boiler to the bottom of the receiver.

13. In an absorption apparatus a generator system comprising a boiler, a receiver adapted to contain refrigerant fluid and store the same at a temperature materially less than the temperature of the boiler, a fluid circuit including said receiver and said boiler and connections therebetween for locally circulating fluid from said receiver to said boiler and from said boiler back to said receiver, said fluid circuit including a thermosiphon element for effecting said circulation and including a means for exchanging heat between the fluid flowing from the receiver to the boiler and the fluid flowing from the boiler to the receiver.

14. In an absorption apparatus, an absorber system, a generator system, connections therebetween operable for periodically effecting transfer of weak liquor from the generator system to the absorber system and strong liquor from the absorber system to the generator system, means for heating at least part of the generator system so as to generate refrigerant vapor, said generator system having a portion thereof arranged for storing weak liquor at a temperature materially less than that prevailing in that part of said generator system in which refrigerant vapor is generated, means for removing heat from said weak liquor before storing the same, and means in said weak liquor storing portion of the generator system for periodically opening the connection between the generator system and the absorber system so as to utilize pressure within the generator system for transferring said stored weak liquor to the absorber system and to permit the transfer to the generator system of a fresh charge of strong liquor.

15. In an absorption apparatus, a generator system comprising a liquid receiver, an analyzer, a boiler, a vent between the upper part of said analyzer and said receiver, a condenser, a vaporous refrigerant conduit including a rectifier between said analyzer and said condenser, and a fluid circuit including said receiver, said analyzer, and said boiler and including connections for circulating fluid therebetween, said connections including a strong liquor line between an intermediate part of said receiver and said analyzer and a weak liquor line between the bottom part of said boiler and said receiver, said strong and weak liquor lines being associated for the interchange of heat therebetween, and said connections including thermosiphon means between the bottom of said analyzer and the upper part of said boiler for effecting said circulation, and including a vapor conduit between the upper part of said boiler and the part of said analyzer below the liquid level therein.

16. In an absorption apparatus of the type having a generator system normally operating at a relatively high pressure, and an absorber system normally operating at a relatively low pressure during the same time that said generator system is operating, means for separating said systems so as to enable a higher pressure to be produced in the generator system than in the absorber system, said separating means operating periodically for equalizing the pressures between the two systems, said generator system comprising a fluid circuit including means for storing strong and weak liquor and a thermosiphon element, and connections between said storing means and said thermosiphon element including means for transferring heat from the hot weak liquor returning to the storing means to the cold strong liquor coming from the storing means, and means for heating said thermosiphon element so as to generate vapor therein and to effect circulation of liquor through said circuits.

HENRY A. BURGGRABE.